Sept. 3, 1946.  R. WATTS  2,407,197
BRAKE ROTOR
Filed Jan. 12, 1944

INVENTOR.
Raymond Watts
BY
Orin O. Garner
Atty.

Patented Sept. 3, 1946

2,407,197

UNITED STATES PATENT OFFICE 2,407,197

BRAKE ROTOR

Raymond Watts, Chicago, Ill., assignor to American Steel Foundries, Chicago, Ill., a corporation of New Jersey Application January 12, 1944, Serial No. 517,942

3 Claims. (Cl. 188—264)

My invention relates to brake discs and more particularly to a brake rotor adapted for connection to an associated rotating member, such as the wheel of a railway car truck, for cooperation with associated braking means.

The general object of my invention is to design a brake rotor incorporating cooling means for transmitting heat rapidly and uniformly from the friction rings of the rotor which comprise the braking surfaces thereof.

A specific object of my invention is to design a novel fabricated brake rotor comprising an internal chamber containing a cooling medium having the characteristics of high thermal capacity and conductivity, such as, for example, metallic sodium, potassium nitrate, lithium nitrate, or sodium nitrate.

My novel fabricated brake rotor comprises an iron or steel cylindrical support member having a bore at one end thereof for the reception of the hub of an associated wheel, said support member having openings therethrough for the reception of means securing the rotor to the wheel. A pair of spaced annular iron or steel friction plates are welded at their inner perimeters to the outer perimeter of the support member and define therewith a chamber for the reception of a cooling medium such as above described, said chamber being closed at its radially outer extremity by means of an iron or a steel closure ring recessed in the outer perimeters of the friction plates and welded thereto.

Figure 1:
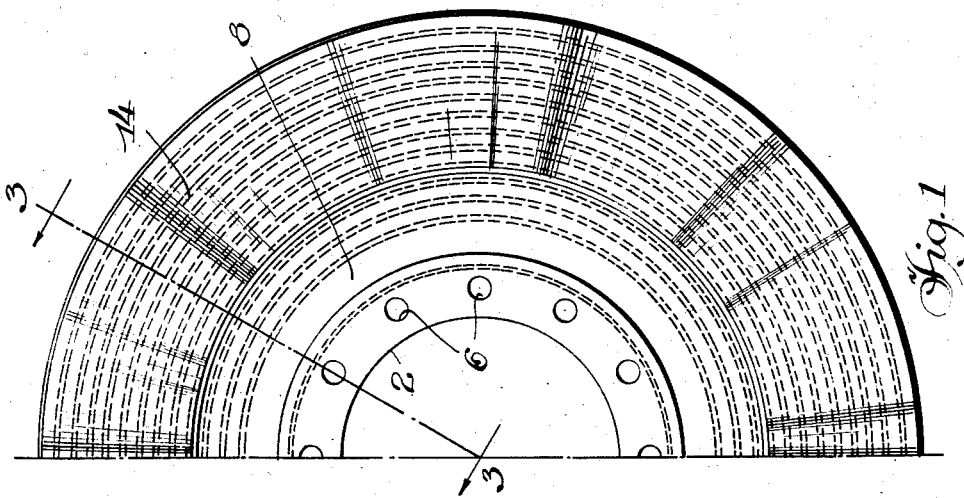

In the drawing, Figure 1 is a fragmentary side elevation of my novel rotor, only one-half of the same being illustrated inasmuch as it is a symmetrical annular member.

Figure 3:
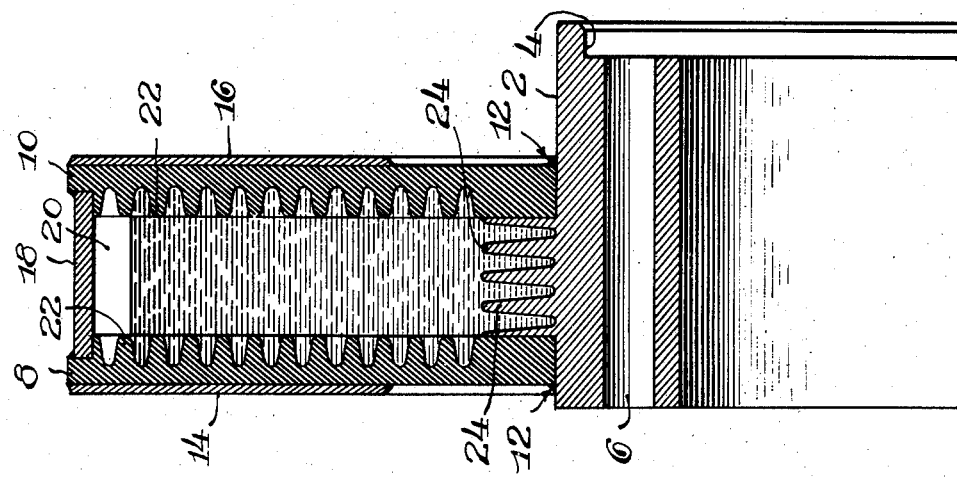
Figure 2:
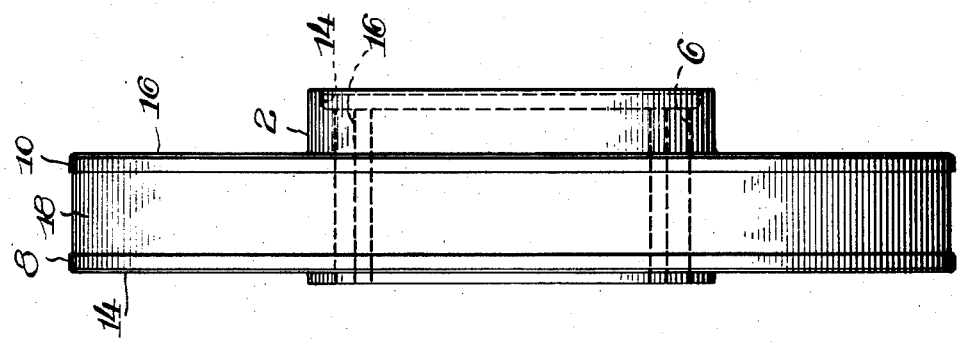

Figure 2 is an edge elevation taken from the right as seen in Figure 1, and Figure 3 is a fragmentary view in radial cross-section, taken in the plane indicated by the line 3—3 of Figure 1.

My novel brake rotor comprises the annular support or hub member 2 preferably formed of iron or steel and having at one end thereof a bore 4 for the reception of an associated rotating element such as, for example, the hub of a wheel. The member 2 is provided with a plurality of openings 6, 6 therethrough for the reception of means securing the rotor to its associated rotating element.

Mounted on the outer perimeter of the support member 2 is a brake ring comprising the spaced annular friction plates 8 and 10 which are preferably welded at their inner perimeters at 12, 12 (Figure 3) to the member 2, said plates having on their remote surfaces the annular radial friction faces 14 and 16 respectively for cooperation with associated brake means. The friction faces 14 and 16 are preferably in the form of annular liners or wear plates secured to the respective plates 8 and 10 in any convenient manner, such as bonding or welding; however, it will be understood that if desired these faces 14 and 16 may be eliminated and the friction surfaces of the brake ring may be integrally formed on the friction plates 8 and 10.

Welded to the friction plates at their outer perimeters is a closure ring 18 defining therewith and with the member 2 a chamber 20 (Figure 3), which is substantially filled with a substance having the characteristics of high thermal conductivity and high thermal capacity such as, for example, metallic sodium, or one of the other substances heretofore mentioned. It may be noted that the chamber 20 is not completely filled with the sodium, a small space being provided for expansion of the latter which may be gasified by heat developed in the friction plates 8 and 10 during a braking operation.

The inner surfaces of the friction plates are provided with fins 22, 22 (Figure 3) which provide a relatively great area of contact between the plates and the cooling substance within the chamber 20, and likewise, the member 2 is provided with a plurality of radial fins 24, 24 affording relatively great area of contact with the cooling substance. It will be understood that although the fins 22, 22 are herein shown as annular members extending axially of the brake ring, and the fins 24, 24 are illustrated as annular members extending radially of the brake ring, the form and arrangement of these fins may be varied as desired.

Thus it will be seen that I have designed a novel brake disc comprising an internal chamber within which is disposed a cooling substance or medium having high thermal conductivity and capacity, said substance being operable to conduct heat rapidly and uniformly from the friction surfaces of the disc to the support member therefor, said substance also being operable to absorb a considerable quantity of heat by virtue of its high thermal capacity.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a fabricated brake rotor, a cylindrical support member having radially and circumferentially extending heat dissipating fins integral with the outer perimeter thereof and spaced from the ends thereof, a brake ring comprising spaced annular plates sleeved over said member and having the inner perimeter thereof welded to the outer perimeter of said member at opposite sides of said fins, said plates defining an annular chamber therebetween, a cylindrical closure ring between said plates and recessed in the outer perimeters thereof and welded thereto, friction plates secured to said annular plates on the remote sides thereof, a plurality of heat dissipating fins integral with the other sides of said annular plates and projecting axially therefrom at opposite sides of said chamber into said chamber, and a substance within said chamber having the characteristics of high thermal capacity and conductivity.

2. In a frabricated brake rotor, a cylindrical support member having at one end thereof a bore for connection to an associated rotating element and provided with radially and circumferentially extending heat dissipating fins integral with the outer perimeter thereof and spaced from opposite ends thereof, a brake ring comprising spaced annular plates sleeved over said member and having the inner perimeters thereof welded to the outer circumference of said member at opposite sides of said fins, said plates defining an annular chamber and having the remote faces thereof providing friction surfaces and the adjacent surfaces thereof formed to provide annular heat dissipating fins circumscribing the axis of said member and projecting axially thereof into said chamber, a cylindrical closure ring welded to the outer perimeters of said plates, and a quantity of a substance having the characteristics of high thermal capacity and conductivity within said chamber substantially filling the same.

3. In a fabricated brake rotor, a cylindrical support member having radially and circumferentially extending heat dissipating fins integral with the outer perimeter thereof and spaced from the ends thereof, spaced annular plates sleeved over said member and receiving said fins therebetween, said plates having the inner perimeters thereof welded to the outer perimeter of said member and defining an annular chamber, friction plates secured to said annular plates on their remote surfaces, a plurality of annular heat dissipating fins on the adjacent faces of said annular plates, said fins circumscribing the axis of said rotor and being radially superposed and projecting axially with respect to said member into said chamber, a cylindrical closure plate recessed in the outer perimeters of said annular plates and welded thereto for closing the radially outer extremity of said chamber, and a quantity of a substance having the characteristics of high thermal capacity and conductivity within said chamber substantially filling the same.

RAYMOND WATTS.